No. 747,969. PATENTED DEC. 29, 1903.
P. HANSON.
WEED ATTACHMENT FOR MOWING MACHINES.
APPLICATION FILED MAR. 4, 1902.
NO MODEL. 2 SHEETS—SHEET 1.
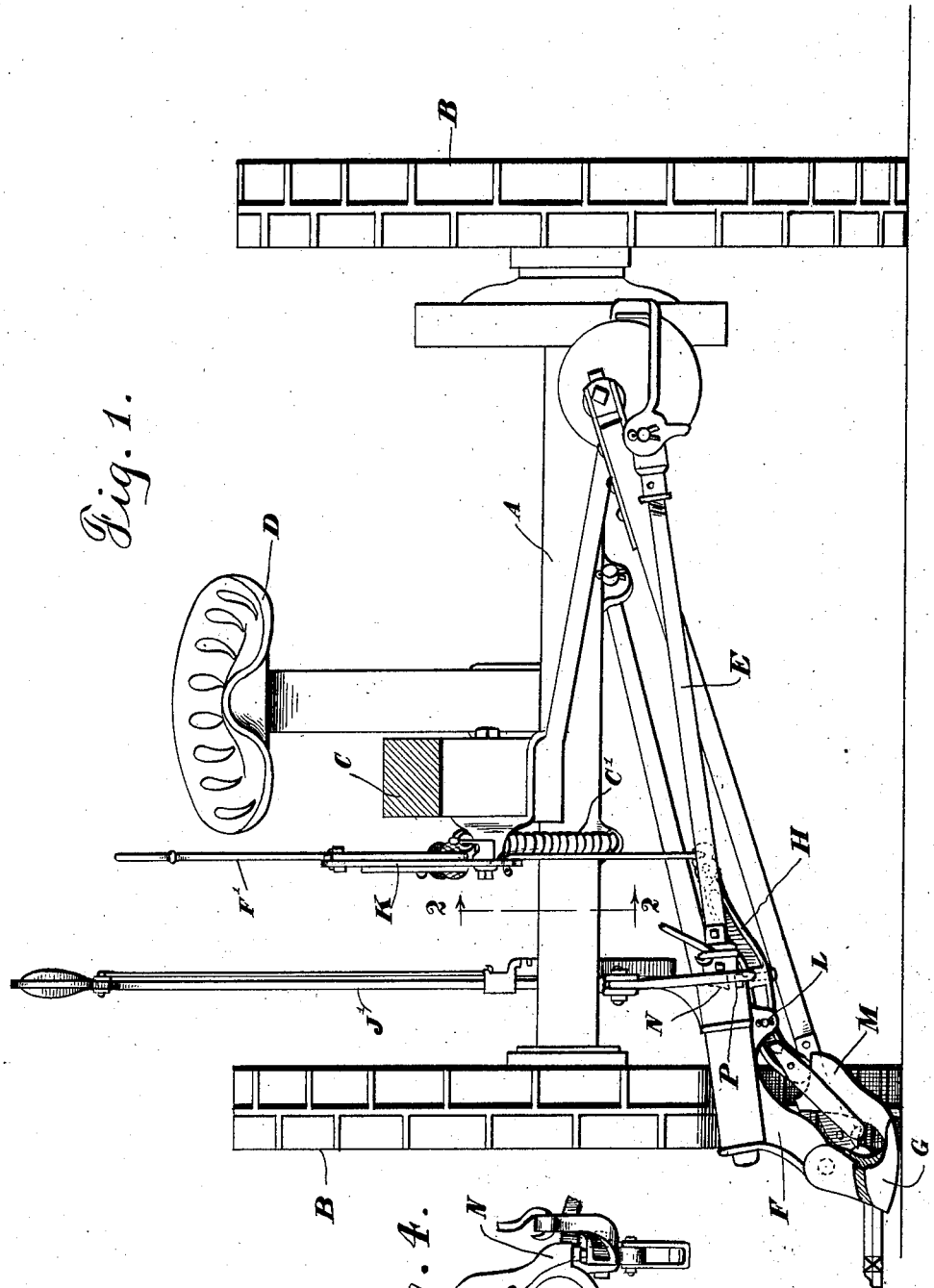

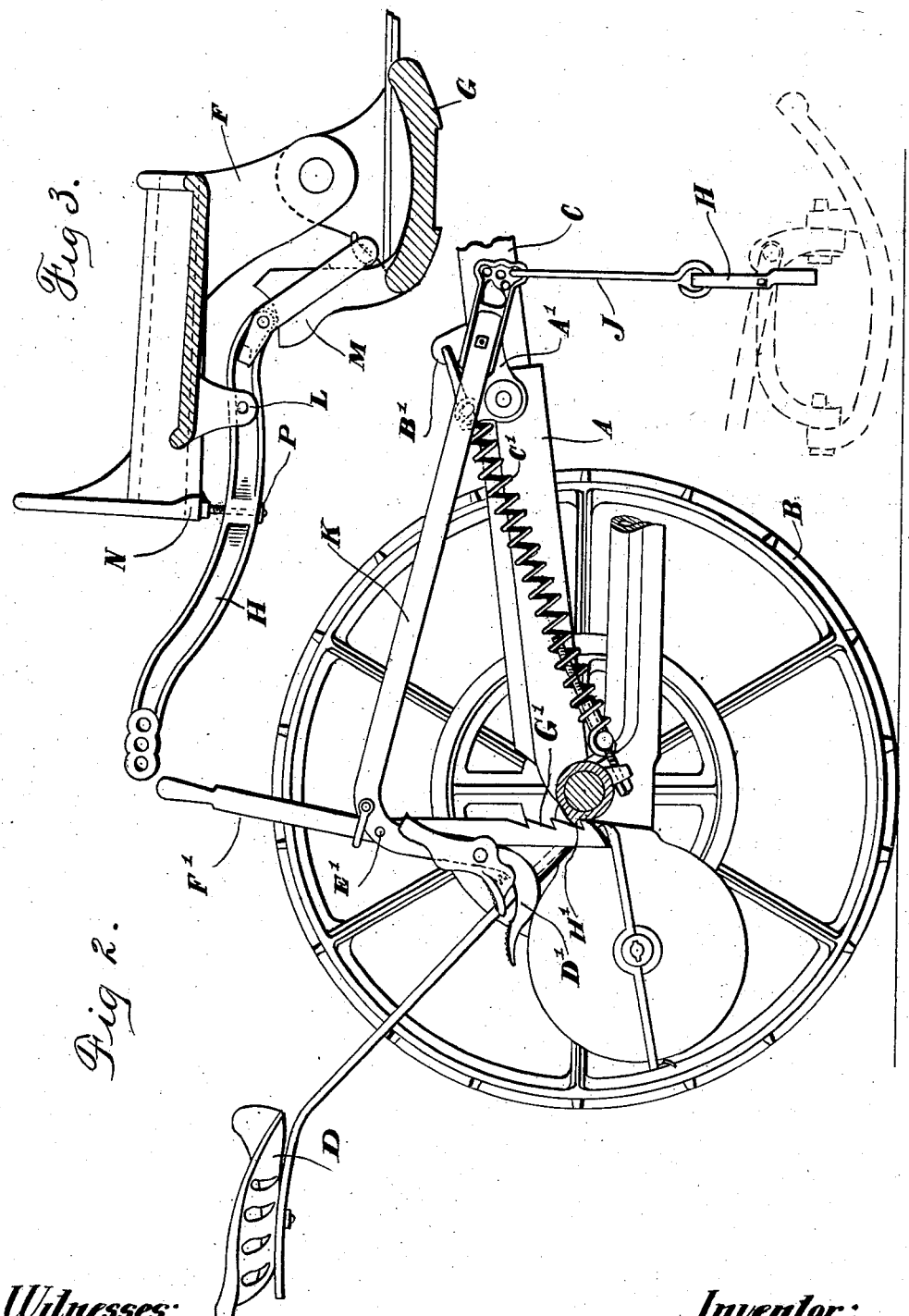

No. 747,969. Patented December 29, 1903.

UNITED STATES PATENT OFFICE.

PAUL HANSON, OF ST. PAUL, MINNESOTA.

WEED ATTACHMENT FOR MOWING-MACHINES.

SPECIFICATION forming part of Letters Patent No. 747,969, dated December 29, 1903.

Application filed March 4, 1902. Serial No. 96,646. (No model.)

*To all whom it may concern:*

Be it known that I, PAUL HANSON, a citizen of the United States, residing at St. Paul, in the county of Ramsey and State of Minnesota, have invented a new and useful Weed Attachment for Mowing-Machines, of which the following is a specification.

This invention relates to weed attachments for mowing-machines.

The object of the invention is to provide means whereby the cutter-bar of a mowing-machine may be elevated or raised into position parallel with itself and with the ground a sufficient height to serve for the purpose of cutting weeds, grass, or other material at a greater height above the surface of the ground than is ordinarily the case with mowing-machines.

The invention consists, substantially, in the construction, combination, location, and relative arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a view in front elevation of a mowing-machine, showing the application thereto of a weed attachment embodying the principles of my invention, the tongue of the machine being shown in vertical transverse section. Fig. 2 is a longitudinal sectional view of the same on the line 2 2, Fig. 1, looking in the direction of the arrows. Fig. 3 is a detached detail view, in side elevation, showing the arrangement of gag-lever embodied in the weed attachment of my invention. Fig. 4 is a detached broken detail view, in end elevation, of the yoke-bearing sleeve, showing the arrangement of the gag-lever with reference thereto.

The same part is designated by the same reference-sign wherever it occurs throughout the several views.

Ordinarily mowing-machines are constructed and designed so that in operation the finger-bar and cutter-bar or sickle will operate in close proximity to the surface of the ground and in parallel relation with respect thereto. This is particularly true of mowing-machines of the floating finger-bar type. It may sometimes, however, be desirable to provide means whereby the finger-bar may be raised a sufficient distance above the surface of the ground, but still in parallel relation with respect thereto, in order to enable the machine to operate on high or tall grass, weeds, or the like, and where the cutter or sickle will be removed from danger of encountering stones or sticks upon the ground, and particularly in operating over uncultivated ground or along roadsides and the like.

It is the special purpose of my invention to provide means whereby the finger-bar and cutters may be raised to any desired height above the surface of the ground and still remain parallel thereto, and in carrying out my invention I provide an exceedingly simple contrivance for accomplishing the desired objects.

Referring to the accompanying drawings, reference-sign A designates the main frame; B, the traction-wheels; C, the tongue or pole of the machine; D, the driver's seat; E, the drag-bar or coupling-arm; F, the yoke sleeved or supported thereon; G, the shoe pivotally mounted upon the yoke; H, the gag-lever; J, the lifting-link, and K the gag-lever-operating treadle or arm. These parts, except as hereinafter noted, may be of the usual or any well-known or convenient construction, type, and arrangement, and in the specific details thereof form no part of my present invention.

In the particular form shown, to which my invention is not limited, the gag-lever is pivotally mounted, as at L, upon a convenient support—as, for instance, a depending lug or projection formed on yoke F. Said yoke is supported upon the drag-bar E, and the shoe is pivotally supported upon the yoke. The shoe is also provided with a bearing extension against which the free end of the gag-lever bears in the usual way. Formed on the yoke or other suitable or convenient part of the frame is a shoulder or lug N, against which the gag-lever H when rocked about its point of pivotal support comes in contact, said lug or shoulder forming a stop for said lever. At the point of contact of the gag-lever with said shoulder or abutment I mount upon said gag-lever an adjusting-bolt P, the head of which forms the bearing contact of said lever with the lug or abutment N. Thus it will be seen that by adjusting the bearing-bolt P the head thereof may be caused to extend more or less above the gag-lever or in closer relation with respect to abutment or shoulder N, thereby limiting the rocking movement of the gag-lever about its pivotal support L.

In the operation of a machine embodying the principles above set forth when it is desired to use the machine for cutting grain or grass and in the ordinary manner the adjusting-bolt P is so adjusted upon the gag-lever as to afford the widest range of rocking movement of the gag-lever about its pivot. Therefore when the gag-lever is rocked in the ordinary manner the free end thereof engages the extension M on the shoe, thereby rocking the shoe about its pivotal support on the yoke, and hence tilting upwardly the outer end of the finger-bar until said lever abuts against the shoulder or lug N, after which a continued pull upon the gag-lever raises the outer end of the drag-bar, the yoke, the shoe, and all of their associated parts, thereby raising the inner as well as the outer end of the finger-bar. This is the ordinary operation of the gag-lever. When, however, it is desired to raise the finger-bar, so as to enable the cutters to operate in a higher plane, still retaining their parallelism with the surface of the ground, the adjusting-bolt P is adjusted so as to be brought into contact with the shoulder or abutment N before the pull is exerted upon the gag-lever, thereby preventing any rocking movement of the gag-lever about its pivotal support L. Consequently the pull exerted upon gag-lever H instead of rocking the same, and thereby tilting the shoe, will raise the shoe vertically without tilt, thereby also raising the finger-bar parallel with respect to itself and with the ground. In this manner the finger-bar may be raised to any desired height above the ground.

In order to sustain the finger-bar in its raised position when the machine is operating as a weed-cutter, any desirable, simple, or convenient construction and arrangement of retaining devices may be employed. It is also obvious that any desired means for exerting the pull on the gag-lever may be employed. I have shown a simple means for accomplishing these results wherein the lifting-link J is connected pivotally to a casting A', suitably pivoted upon a convenient part of the framework and which is provided with an extension B', to which is connected in any suitable or convenient manner one end of a spring C', the other end of said spring being adjustably connected in any suitable or convenient manner to a fixed part of the framework, said spring thereby serving as a counterbalance for the gag-lever and the parts supported thereby. The gag-lever-operating arm or lever K may be suitably secured at one end to or formed with casting A' and extends therefrom rearwardly to a convenient position to be manipulated by the driver. To this end said lever may be provided with a treadle portion D', by which said arm or lever K may be manipulated by the foot of the driver. Suitably pivoted upon lever or arm K, as at E', is an arm F', having ratchet-teeth (indicated at G') thereon, which ratchet-teeth are arranged to cooperate with a lug or shoulder H', formed on a convenient part of the fixed framework, whereby when said arm or lever K is depressed said ratchet-teeth ride over, engage, and are retained by the lug or projection H', thereby holding the lever or arm K in its desired position of depression, and hence maintaining the finger-bar in its desired position of height. When the machine is not employed for cutting weeds, the ratchet-bar F' may be removed; but no change is necessary in the gag-lever further than to so adjust the adjusting-bolt P as to provide the desired range of rocking movement of the gag-lever in the ordinary manner.

The yoke F may be suitably connected to a tilting lever J' in the usual or ordinary manner.

It is obvious that many variations and changes in the details of construction and arrangement would readily occur to persons skilled in the art and still fall within the spirit and scope of my invention. I do not desire, therefore, to be limited or restricted to the exact details shown and described; but, Having now set forth the object and nature of my invention and a construction embodying the principles thereof, what I claim as new and useful and of my own invention, and desire to secure by Letters Patent, is—

1. In a mowing-machine, the combination with a finger-bar, a movable support upon which the finger-bar is pivotally mounted, of a gag-lever pivotally mounted on said support and arranged to rock the finger-bar, and means for arresting the gag-lever before it attains rocking relation with respect to the finger-bar, whereby said finger-bar and support are bodily raised in unison, as and for the purpose set forth.

2. In a mowing-machine, a shoe, a finger-bar supported thereon, a movable support upon which said shoe is pivotally mounted, a gag-lever for rocking said shoe about its pivot, and adjustable connections whereby said lever is caused to bodily raise said shoe-support without rocking said shoe, as and for the purpose set forth.

3. In a mowing-machine, a shoe, a finger-bar, and a gag-lever, a supporting-frame for the shoe capable of vertical movement, and an adjustable stop upon the gag-lever arranged to contact with said frame to vertically raise the same and also limit the swinging movement of the gag-lever, as and for the purpose set forth.

4. In a mowing-machine, a shoe, a finger-bar, and a gag-lever, a supporting-frame for the shoe capable of vertical movement, and an adjustable stop upon the gag-lever arranged to contact with said frame to vertically raise the same and also limit the swinging movement of the shoe and finger-bar, as and for the purpose set forth.

In witness whereof I have hereunto set my hand, this 1st day of March, 1902, in the presence of the subscribing witnesses.

PAUL HANSON.

Witnesses:
E. C. SEMPLE,
S. E. DARBY.